(12) United States Patent
Terada (10) Patent No.: US 7,128,549 B2
(45) Date of Patent: Oct. 31, 2006

(54) COOLING MECHANISM FOR COOLING ELECTRIC DRIVING PART OF INJECTION MOLDING MACHINE AND COOLING METHOD FOR THE SAME

(75) Inventor: Shinji Terada, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 323 days.

(21) Appl. No.: 10/456,591

(22) Filed: Jun. 9, 2003

(65) Prior Publication Data

US 2003/0230830 A1 Dec. 18, 2003

(30) Foreign Application Priority Data

Jun. 12, 2002 (JP) ............................. 2002-171446
Jun. 24, 2002 (JP) ............................. 2002-183514

(51) Int. Cl.
*B29C 45/46* (2006.01)
(52) U.S. Cl. .................... 425/143; 425/145; 425/149; 417/363
(58) Field of Classification Search ............... 425/143, 425/145, 149; 417/363, 350
See application file for complete search history.

(56) References Cited

U.S. PATENT DOCUMENTS 4,146,601 A * 3/1979 Bishop ....................... 425/145
5,181,837 A * 1/1993 Niemiec ...................... 417/350
5,354,182 A * 10/1994 Niemiec et al. ............. 417/363
5,580,584 A 12/1996 Mussler et al.
5,580,585 A * 12/1996 Holzschuh .................. 425/145
5,620,646 A * 4/1997 Sparer et al. .......... 264/328.14
5,707,667 A * 1/1998 Galt et al. ................... 425/589
6,048,179 A * 4/2000 Forster ....................... 417/364
6,299,427 B1* 10/2001 Bulgrin et al. .............. 425/145
2003/0064125 A1* 4/2003 Shiau ......................... 425/145

FOREIGN PATENT DOCUMENTS

| DE | 43 34 134 A1 | | 4/1995 |
| DE | 198 31 483 A1 | | 1/2000 |
| DE | 19831483 | * | 1/2000 |
| EP | 0 778 652 A2 | | 6/1997 |
| JP | 08-103053 | | 4/1996 |
| JP | 11-077785 | | 3/1999 |
| WO | WO 00/03861 | | 1/2000 |

* cited by examiner

*Primary Examiner*—Joseph S. Del Sole
*Assistant Examiner*—Maria Veronica Ewald
(74) *Attorney, Agent, or Firm*—Squire, Sanders & Dempsey L.L.P.

(57) ABSTRACT

A cooling mechanism for cooling an electric driving part of an injection molding machine, includes a cooling part for cooling the electric driving part; and an actuating part actuated by being supplied an actuating fluid, the actuating fluid being in fluid communication with the cooling part. The actuating fluid may be used as a cooling fluid for cooling the electric driving part.

11 Claims, 4 Drawing Sheets

LOADED SIDE  UNLOADED SIDE (b)

COOLING MECHANISM FOR COOLING ELECTRIC DRIVING PART OF INJECTION MOLDING MACHINE AND COOLING METHOD FOR THE SAME

BACKGROUND OF THE INVENTION

1. Field of the Invention

The present invention generally relates to cooling mechanisms for cooling electric driving parts of injection molding machines and cooling methods for the same, and more particularly, to a cooling mechanism for cooling an electric driving part of a hybrid type injection molding machine having an actuating part actuated by being supplied an actuating fluid, and a cooling method for the same.

2. Description of the Related Art

In an injection molding machine, resin heated and melted in a heating cylinder is injected into a cavity of a mold apparatus under high pressure so that the cavity is filled with the molten resin. The molten resin is then cooled and solidified so as to obtain a molded article.

Such an injection molding machine includes an injection apparatus, a mold clamping apparatus and the mold apparatus. The mold apparatus is provided with a stationary side mold unit and a movable side mold unit. The movable side mold unit is advanced and retracted by the mold clamping apparatus, so as to perform mold closing, mold clamping and mold opening.

The injection apparatus includes a heating cylinder and a screw. The screw is disposed inside the heating cylinder so that the screw can be rotated about an axis and can be advanced and retracted. The screw is advanced so that the resin is injected from the injection nozzle provided at a head end of the heating cylinder, and thereby the resin fills the cavity space of the mold apparatus.

Furthermore, the injection apparatus includes an injection apparatus main part supported on a frame of the injection molding machine and a moving apparatus for plasticizing. By operating the moving apparatus for plasticizing, the injection apparatus main part is advanced and retracted, and a nozzle opening part formed at a head end of the injection nozzle can come in contact with and separate from a stationary platen of the stationary side mold unit. The resin is injected from the injection nozzle in a state where the nozzle opening comes in contact with the stationary platen.

Meanwhile, there is a hybrid type injection molding machine in the field of injection molding machines. The hybrid injection molding machine includes an electric driving part such as an electric motor and an actuating part. Oil is supplied as an actuating fluid to the actuating part so that the actuating part is actuated by hydraulic pressure.

In such a hybrid type injection molding machine, a hydraulic actuating part is actuated for injection. An electrically powered machine such as a motor is driven for mold clamping, metering and moving for plasticizing (other than for injection) as an electric driving part, so that mold closing, mold clamping, mold opening, metering, retraction so-called suck back, nozzle touch, ejecting a molded article, and others are performed.

In a case where the electrically powered machine(motor) is used as the driving part, normally, a fan provided with the motor is operated for air-cooling the motor forcibly so as to correspond to heat generation based on motor driving (forced air cooling method).

Furthermore, not only the above mentioned forced air cooling method but also a cooling fluid passing method is applied for cooling the electrically powered machine as a driving part of the injection molding machine. In the cooling fluid passing method, a jacket is provided at an external circumference of the electric driving part. A cooling fluid path is formed by a groove of the jacket, so that cooling fluid such as water or oil is passed through the cooling fluid path, thereby cooling the electric driving part.

However, in the forced air cooling method, the electric driving part is cooled only by the fan. Hence, it may be difficult to sufficiently dissipate the heat generated by driving the electric driving part. Therefore, the rated output of the heat of the electric driving part is required to be small.

Furthermore, in the cooling fluid passing method, separate equipment having a large size is necessary. Hence, the injection molding machine is required to have a large size and manufacturing cost is increased. In addition, in a case where water is used as the cooling fluid, for example, corrosion may occur inside of the cooling fluid path due to poor water quality, and condensation may occur when water temperature is lower than air temperature. The above mentioned occurrences of corrosion and condensation may cause a problem such as an electrical short of the motor.

SUMMARY OF THE INVENTION

Accordingly, it is a general object of the present invention to provide a novel and useful cooling mechanism for cooling an electric driving part of an injection molding machine and a cooling method for the same, in which one or more of the problems described above are eliminated.

Another and more specific object of the present invention is to provide a cooling mechanism for cooling an electric driving part of the injection molding machine and a cooling method for the same whereby the electric driving part can be cooled sufficiently.

It is also an object of the present invention to provide a cooling mechanism for cooling an electric driving part of an injection molding machine, includes a cooling part for cooling the electric driving part; and an actuating part actuated by being supplied an actuating fluid, the actuating fluid being in fluid communication with the cooling part. The actuating fluid may be used as a cooling fluid for cooling the electric driving part.

It is also an object of the present invention to provide a cooling method for an electric driving part of an injection molding machine, the injection molding machine including an electric driving part and an actuating part actuated by being supplied an actuating fluid, including using the actuating fluid as a cooling fluid for cooling the electric driving part.

Other objects, features, and advantages of the present invention will become more apparent from the following detailed description when read in conjunction with the accompanying drawings.

DETAILED DESCRIPTION OF THE PREFERRED EMBODIMENT

A description will now be given, with reference to FIGS. 1 through 4, of embodiments of the present invention.

Figure 1:
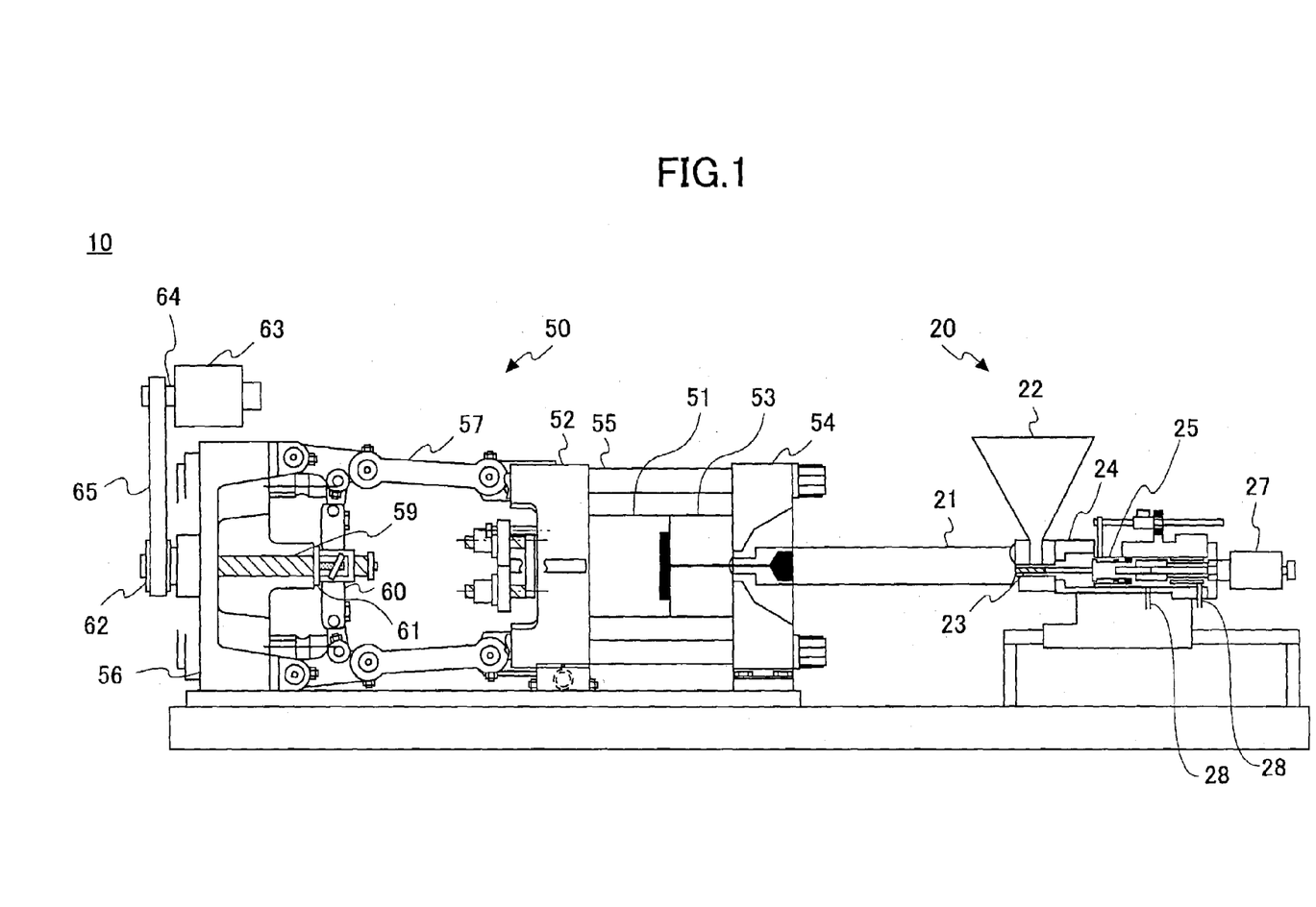
FIG. 1 is a schematic structural view of an injection molding machine of an embodiment of the present invention.

FIG. 1 is a schematic structural view of an injection molding machine 10 of an embodiment of the present invention. Referring to FIG. 1, the injection molding machine 10 is a hybrid type injection molding machine having an electric driving part and an actuating part. Oil for actuating is supplied to the actuating part so that the actuating part is actuated.

The injection molding machine 10 includes an injection apparatus 20 and a mold clamping apparatus 50.

The injection apparatus 20 includes a heating cylinder 21. A hopper 22 is disposed on the heating cylinder 21. A screw 23 is disposed inside the heating cylinder 21 so that the screw 23 can be rotated about an axis and can be advanced and retracted. An injection cylinder 24 is provided at an end of the screw 23.

An injection piston 25 is disposed inside of the injection cylinder 24 so as to move in a liner direction. The injection piston 25 is reciprocating-operated based on a supply of pressurized oil from an oil path 28 so that the screw 23 is advanced and retracted. That is, the injection cylinder 24 and the injection piston 25 function as an actuating part, namely an actuator 98 as described below (See FIG. 2). The pressurized oil is supplied to the actuating part as an actuating fluid so that the actuating part is actuated.

A motor 27 such as a servo motor for rotating the screw 23 is provided at a rear end of the injection piston 25 as an electric driving part. The servo motor 27 is provided on the same axis formed by the screw 23, the injection cylinder 24 and the injection piston 25.

The mold clamping apparatus 50 includes a movable platen 52 where a movable mold 51 is attached and a stationary platen 54 where a stationary mold 53 is attached. The stationary platen 54 is connected to a toggle support 56 described below by tie bars 55. The movable platen 52 can slide along the tie bars 55. The mold clamping apparatus 50 also includes a toggle mechanism 57. One end part of the toggle mechanism 57 is connected to the movable platen 52 and the other end of the toggle mechanism 57 is connected to a toggle support 56. A ball screw shaft 59 is rotatably supported at the center of the toggle support 56.

A nut 61, provided at a cross head 60 that is disposed at the toggle mechanism 57, is slidably and matably engaged with the ball screw shaft 59. A pulley 62 is provided at a rear end part of the ball screw shaft 59. A timing belt 65 is stretched and provided between the pulley 62 and an output shaft 64 of a mold clamping motor 63 such as a servo motor.

Accordingly, in the mold clamping apparatus 50, when the mold clamping motor 63 is driven as a driving part, rotation of the mold clamping motor 63 is transmitted to the ball screw shaft 59 as a driving transmission part by the timing belt 65. Furthermore, motion direction is converted from a rotational motion to a rectilinear motion by the ball screw shaft 59 and the nut 61 so that the toggle mechanism 57 is acted upon. Based on the toggle mechanism 57 being acted on, the movable platen 52 slides along the tie bars 55 so that the movable mold 51 is closed to, clamped to or opened from the stationary mold 53.

Figure 2:
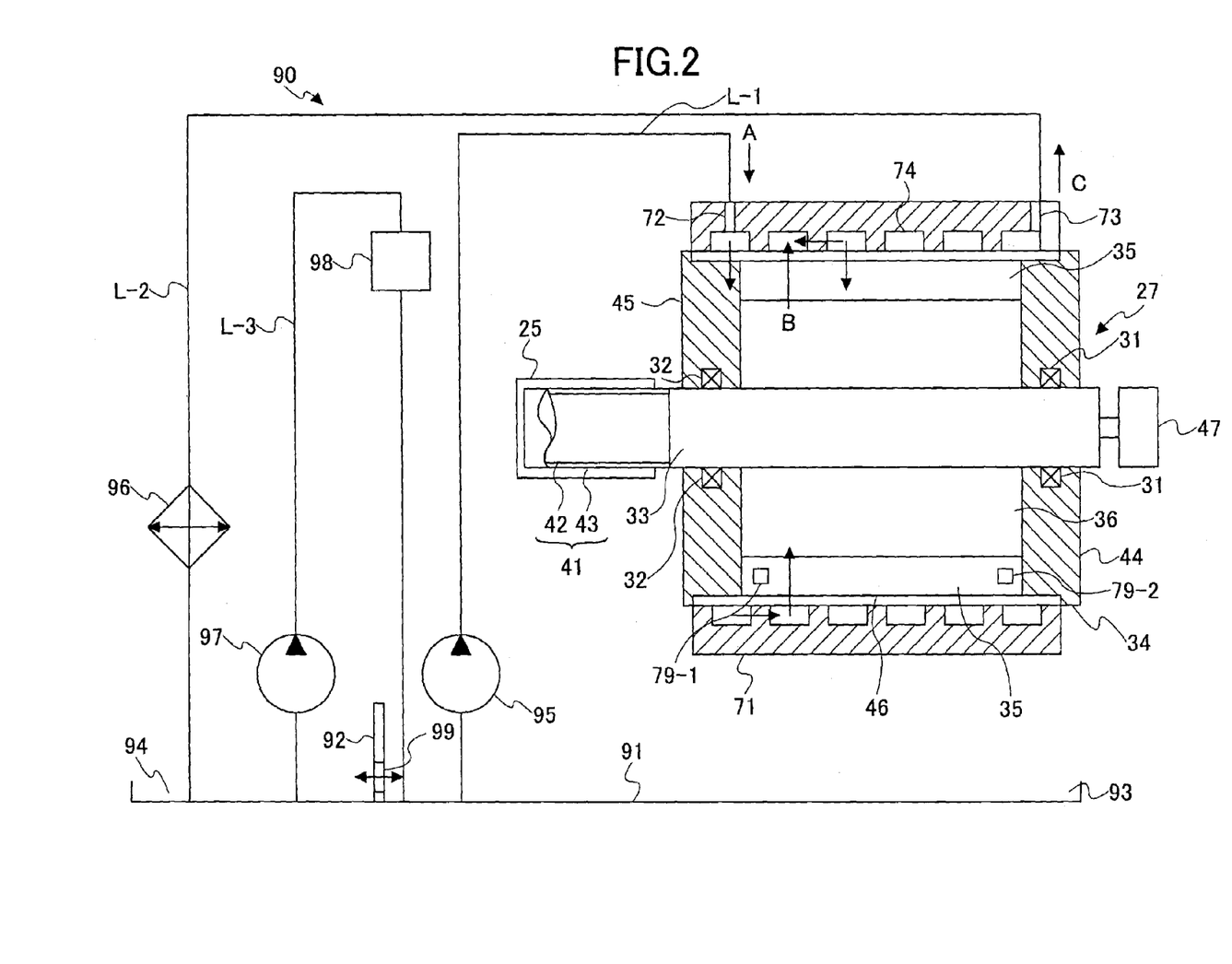
FIG. 2 is a conceptual view of a cooling mechanism of a servo motor rotating a screw of the injection molding machine shown in FIG. 1.

FIG. 2 is a conceptual view of a cooling mechanism of the servo motor 27 rotating the screw 23 of the injection molding machine 10 shown in FIG. 1.

Referring to FIG. 2, the servo motor 27 includes a driving part case 34, a stator 35, a rotor 36, and an output shaft 33. The stator 35 is provided with the driving part case 34. The rotor 36 is provided in the stator 35 in a diameter direction so as to be rotated. The output shaft 33 extends through the rotor 36. The output shaft 33 can be rotated with respect to the driving part case 34 by a first bearing 31 and a second bearing 32.

The driving part case 34 is provided at a first side plate 44 and a second side plate 45 and the space between the first side plate 44 and the second side plate 45. The driving part case 34 is formed by the motor frame 46 having a pipe configuration extending in an axial direction.

The first bearing 31 is provided at the first side plate 44. The second bearing 32 is provided at the second side plate 45. The stator 35 is provided at the motor frame 46.

The stator 35 has a coil not shown. The servo motor 27 is driven by supplying a designated electrical current to the coil so that the rotor 36 rotates at a rotational speed corresponding to the amount of the electrical current. The rotation of the rotor 36 is transmitted to the output shaft 33 where the rotor 36 is provided.

An encoder 47 is provided at an end part in an axial direction of the output shaft 33 where a mechanism part (not shown) is not connected, namely at an end part of an unloaded side of the output shaft 33. The encoder 47 functions as a rotational speed detection part for detecting the rotational speed of the servo motor 27.

An inserting spline 42 is formed at an end part in an axial direction of the output shaft 33 where a mechanism part (not shown) is connected, namely at an end part of a loaded side of the output shaft 33. A receiving spline 43 is formed at an end part of the injection piston 25 provided inside of the injection cylinder 24 shown in FIG. 1. The inserting spline 42 and receiving spline 43 form a spline connection part 41.

Rotational power generated by driving the servo motor 27 is transmitted to the injection piston 25 via the spline connection part 41, so that the screw 23 is rotated.

Meanwhile, when the servo motor 27 is driven, heat is generated. In order to dissipate the heat so as to cool the servo motor 27 in the exemplary embodiment, a jacket 71, for example, is provided at the external circumference of the driving part case 34 as a cooling part.

The jacket 71 includes a cooling fluid supply opening part 72, a cooling fluid discharge opening part 73, and a single cooling fluid path 74. Oil having a designated temperature is supplied to the cooling fluid supply opening part 72 as a cooling fluid. The servo motor 27 is cooled by the oil so that the oil temperature is increased. And then the oil is discharged from the cooling fluid discharge opening part 73. The cooling fluid supply opening part 72 and the cooling fluid discharge opening part 73 are connected by the cooling fluid path 74. The cooling fluid path 74 is extended so as to form a meandering shape or a spiral shape, for example.

As described above, in this embodiment, the oil is used as the cooling fluid. However, if necessary, water or refrigerant may be used as the cooling fluid.

Furthermore, as described above, in this embodiment, the cooling fluid path 74 is extended so as to form a spiral meandering shape. However, a manifold at an entrance side may be provided at a side of the cooling fluid supply opening part 72. A manifold at an exit side may be provided at a side of the cooling fluid discharge opening part 73. By forming a plurality of parallel cooling fluid paths between the manifold at the entrance side and the manifold at the exit side, a plurality of cooling fluid paths may be formed along the output shaft 33.

The oil supplied to the cooling fluid path 74 in the arrow A direction via the cooling fluid supply opening part 72 meanders as shown by the arrow B and flows backward (leftward in FIG. 2). While flowing, the oil cools the servo motor 27 and is eventually discharged in the arrow C direction from the cooling fluid discharge opening part 73.

Figure 3:
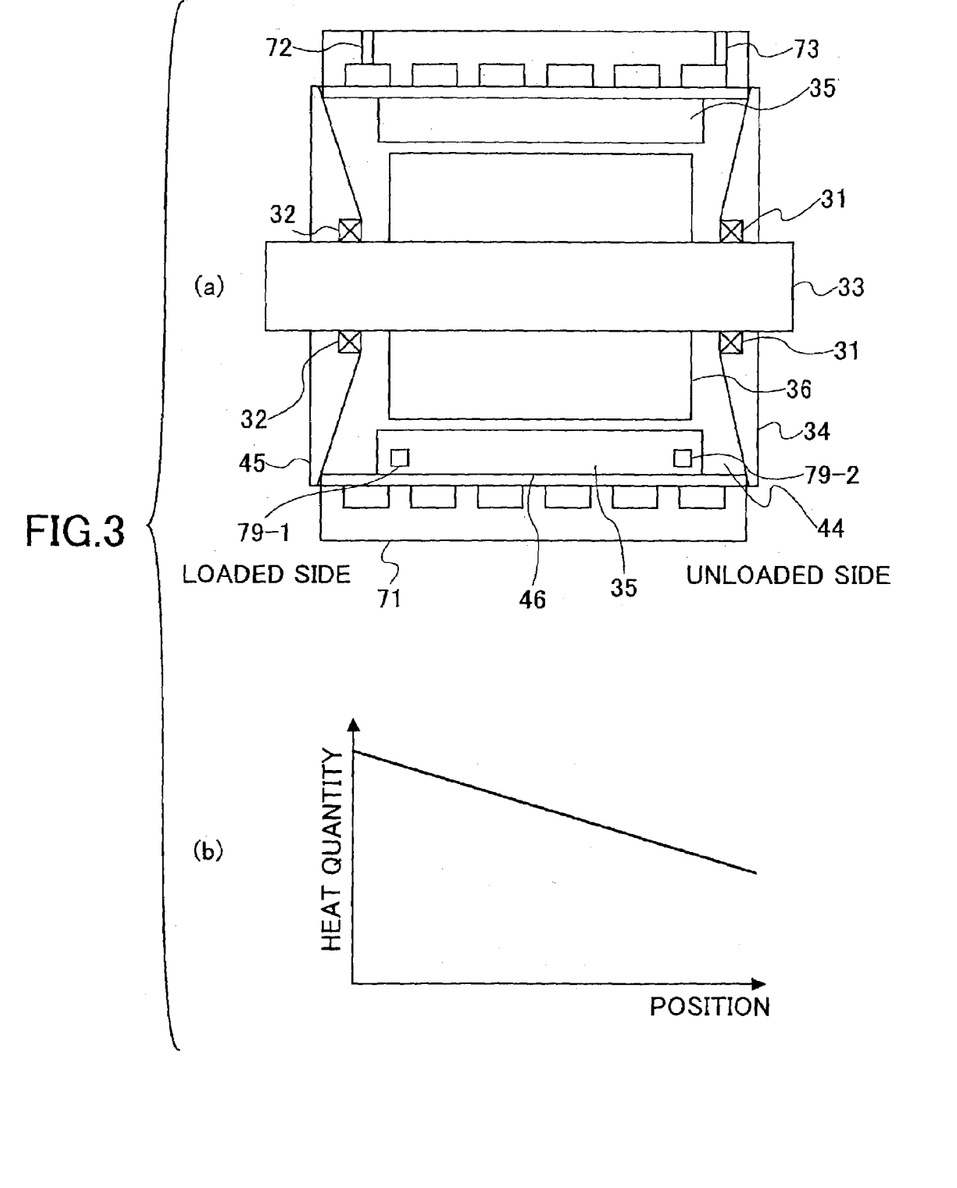
FIG. 3 is a view showing a temperature distribution of the servo motor shown in FIG. 2.

Meanwhile, FIG. 3 is a view showing a temperature distribution of the servo motor 27 shown in FIG. 2.

Referring to FIG. 3, the quantity of heat at a side (i.e., left side as viewed in FIG. 3) in an axial direction of the servo motor 27 where a mechanism part (not shown) is connected (namely at the loaded side of the servo motor 27) is greater than the quantity of heat at a side (i.e., right side as viewed in FIG. 3) in an axial direction of the servo motor 27 where a mechanism part (not shown) is not connected (namely at the unloaded side of the servo motor 27).

That is, the quantity of heat generated by receiving a load at the second bearing 32 situated at the loaded side and transmitted to the motor frame 46, is greater than the quantity of heat generated at the first bearing 31 situated at the unloaded side and transmitted to the motor frame 46. Furthermore, the heat generated by converting motion direction with the spline connection part 41 is transmitted to the output shaft 33 of the servo motor 27 via the spline connection part 41.

Hence, in this embodiment, the encoder 47 formed by a material having a weak resistance to heating is provided at a rear end of the screw shaft 33 (at the right end in FIG. 3-(a)). The rear end of the screw shaft 33 is an unloaded side where the quantity of heat to be transmitted is relatively small. The encoder 47 is used for detecting the rotational speed of the servo motor 27. Under the above mentioned structure, the influence of heat on the encoder 47 can be made relatively small, and thereby the encoder 47 is not overheated As described above, in this embodiment, the cooling fluid supply opening part 72 to which oil having a relatively low temperature is provided at the loaded side, and the cooling fluid discharge opening part 73 from which the oil having a relatively high temperature is discharged is provided at the unloaded side.

Accordingly, a temperature difference at the loaded side between the oil and the servo motor 27 can be made relatively large, and a temperature difference at the unloaded side between the oil and the servo motor 27 can be made relatively small. Hence, it is possible to improve the cooling efficiency of the jacket 71, so that the servo motor 27 can be cooled sufficiently. Because of this, the rated output of heat of the servo motor 27 can be large.

Meanwhile, in this embodiment, a loaded side temperature sensor 79-1 is provided at the loaded side and an unloaded side temperature sensor 79-2 is provided at the unloaded side, as driving part temperature detection parts, in order to detect temperatures of the servo motor 27.

More specifically, the loaded side temperature sensor 79-1 is provided at an end part of the second side plate 45 of the stator 35.

The quantity of heat transmitted to the loaded side, namely the side of the servo motor 27 where a mechanism part is connected in an axial direction, is greater than the quantity of heat transmitted to the unloaded side, namely the side of the servo motor 27 where a mechanism part is not connected in an axial direction. That is to say, the temperature at the loaded side is higher than the temperature at the unloaded side. It is possible to directly detect the temperature at the loaded side by the loaded side temperature sensor 79-1.

The unloaded side temperature sensor 79-2 is provided at an end part of the first side plate 44 of the stator 35.

In a case where a temperature detected by the unloaded side temperature sensor 79-2 is higher than a threshold value, electric current to the stator 35 is stopped by a control part (not shown). As a result of this, rotation of the servo motor 27 stops. Here, the above mentioned threshold value is determined by considering the temperature difference between the loaded side and the unloaded side.

More specifically, the threshold value at the unloaded side is set lower than the threshold value at the loaded side. In a case where an abnormal operation occurs so that the oil as the cooling fluid for the servo motor 27 is not supplied to the jacket 71, the temperature of the servo motor 27 at the unloaded side is easier to be increased to the threshold value than the temperature of the servo motor 27 at the loaded side. Since the threshold value at the unloaded side is set lower than the threshold value of the loaded side, it is possible to immediately detect the generation of the abnormal operation.

In this embodiment, the temperature at the unloaded side of the servo motor 27 becomes higher because the temperature distribution of the servo motor 27 in an axial direction is uniform. Therefore, when the temperature of the servo motor 27 becomes higher, it is possible to reliably detect the temperature of the servo motor 27. As a result of this, it is possible to prevent the servo motor 27 from being overheated.

Furthermore, since the temperature distribution of the servo motor 27 in the axial direction can be uniform, it is possible to prevent the second bearing 32 from being overheated. Therefore, in a case where a sealed lubricant bearing is used as the second bearing 32, it is possible to prevent deterioration of the antifriction characteristic.

Furthermore, since the unloaded side temperature sensor 79-2 is provided at the vicinity of the encoder 47, it is possible to detect the temperature in the vicinity of the encoder 47. Therefore, the unloaded side temperature sensor 79-2 can be used for protecting the encoder 47.

Thus, in this embodiment, since the loaded side temperature sensor 79-1 is provided at the loaded side and the unloaded side temperature sensor 79-2 is provided at the unloaded side, for example, the loaded side temperature sensor 79-1 provided at the loaded side can be used for detecting the temperature at the time of normal operation and the unloaded side temperature sensor 79-2 can be used for detecting the generation of an abnormal operation.

Next, referring back to FIG. 2, a hydraulic circuit 90, which functions as an oil supplying apparatus for supplying the oil to the jacket 71 of the servo motor 27, will be described.

The hydraulic circuit 90 includes a reservoir tank 91, a first pump 95, a second pump 97, a heat exchanger 96, a hydraulic actuator 98, and oil paths L-1 through L-3. A cooling apparatus for the servo motor 27 is formed by the hydraulic circuit 90 and the jacket 71.

The reservoir tank 91 functioning as an oil tank includes a first tank 93 and a second tank 94. The oil is received at the first tank 93. Oil having a lower temperature than the oil received at the first tank 93 is received at the second tank 94.

The reservoir tank 91 can be divided into the first tank 93 and the second tank 94 by a partition board 92. A part 99 forming a through hole for connecting the first tank 93 and the second tank 94 via a hole is provided at the vicinity of the bottom surface of the partition board 92.

The first pump 95 pumps the oil received in the first tank 93 and supplies it to the jacket 71. That is, the first pump 95 which is a circulation pump functions as a first oil supply source. The first pump 95 is provided at the oil path L-1 by which the first tank 93 is connected to the cooling fluid supply opening part 72.

The heat exchanger 96 cools the oil discharged from the jacket 71. The heat exchanger 96 is provided at the oil path L-2 by which the cooling fluid discharge opening part 73 and the second tank 94 communicate.

The second pump 97 pumps the oil in the second tank 94 and supplies the oil to the hydraulic actuator 98. That is, the second pump 97 functions as a second oil supply source.

The second pump 97 and the hydraulic actuator 98 are provided at the oil path L-3 by which the first tank 93 is connected to the second tank 94.

The hydraulic actuator 98 in this embodiment includes the injection cylinder 24 for advancing and retracting the screw 23 shown in FIG. 1 and the injection piston 25. Since the injection cylinder 24 and the injection piston 25 are required to be operated at a high speed and under high pressure, the injection cylinder 24 and the injection piston 25 are suitable for being driven by hydraulic pressure.

The hydraulic actuator 98 is actuated by the oil supplied from the second pump 97. The oil is used by the hydraulic actuator 98 so that oil leaving the hydraulic actuator 98 has a relatively higher temperature than oil entering. This oil having the higher temperature is communicated to the first tank 93.

The first pump 95 is used for cooling the servo motor 27. The second pump 97 is used for actuating the hydraulic actuator 98. In the exemplary embodiment, the capacity of the first pump 95 is smaller than the capacity of the second pump 97. Since the second pump 97 has to actuate the hydraulic actuator 98 continuously, the second pump 97, preferably has a larger capacity. On the other hand, it is sufficient for the first pump 95 to correspond to heat generation based on driving of the servo motor 27 and therefore the required capacity of the first pump 95 may be smaller than the required capacity of the second pump 97.

Furthermore, a motor such as a servo motor can be used as a driving source of the first pump 95 and the second pump 97. A fixing discharge pump which delivers a designated discharge amount of the oil is used as the first pump 95. A variable discharge pump which delivers a variable discharge amount of the oil other than the above mentioned fixing discharge pump is used as the second pump 97 based on an actuation method of the hydraulic actuator 98.

The oil received in the second tank 94 is pumped by the second pump 97 and supplied to the hydraulic actuator 98 via the oil path L-3. Because of this, the injection piston 25 in the injection cylinder 24 is driven forward and backward so that the screw 23 is advanced and retracted.

Thus, this oil is used for actuating the hydraulic actuator 98. The temperature of the oil when the oil is received in the first tank 93 is relatively higher than the temperature of the oil when the oil is received in the second tank 94. However, since the oil received at the first tank 93 has a sufficiently allowable heat capacity against heat generated by the servo motor 27 driving with a high duty, the oil in the first tank 93 can be used for cooling the servo motor 27.

Therefore, after the hydraulic actuator 98 is actuated, the oil has a relatively higher temperature than the oil before not used for the hydraulic actuator 98 and is drained in the first tank 93.

The oil having a relatively higher temperature received in the first tank 93 is pumped by the first pump 95 and supplied to the jacket 71 of the servo motor 27 via the oil path L-1.

The oil supplied to the jacket 71 of the servo motor 27 exchanges heat with the servo motor 27 at the jacket 71 so as to cool the servo motor 27. As a result of this, the temperature of the oil becomes further higher and then the oil is discharged from the jacket 71 and supplied to the heat exchanger 96 via the oil path L-2.

The temperature of the oil supplied to the heat exchanger 96 becomes lower by being cooled with a heat exchange medium such as a cooling water at the heat exchanger 96 and then the oil cooled by the heat exchanger 96 is communicated to the second tank 94.

That is, in this embodiment, the oil actuates the hydraulic actuator 98 which results in the oil having a higher temperature. The oil is then flowed to the servo motor 27 continuously in order to cool the servo motor 27. Therefore, the servo motor 27 can be cooled efficiently under high heat efficiency.

Furthermore, it is not necessary for separately providing exclusive large size equipment for cooling the servo motor 27. Hence, it is possible to cool the servo motor 27 efficiently with an easy structure.

Thus, the oil received in the second tank 94 is supplied to the hydraulic actuator 98 so as to actuate the hydraulic actuator 98. After that, the oil is drained to the first tank 93. Furthermore, the oil in the first tank 93 is supplied to the jacket 71 so as to cool the servo motor 27. After that, the oil is supplied to the heat exchanger 96 so as to be cooled and then is drained at the second tank 94.

As a result of this, the oil having a high temperature from the hydraulic actuator 98 and returning to the reservoir tank 91 and the cooled oil from the heat exchanger 96 are separated in the reservoir tank 91. The oil having the high temperature from the hydraulic actuator 98 is received in the first tank 93. The cooled oil is received in the second tank 94.

In the exemplary embodiment, the variable discharge pump is used as the second pump 97. Therefore, there may be a case where the discharge amount of the first pump 95 is different from the discharge amount of the second pump 97. In a case where the discharge amount of the first pump 95 is smaller than the discharge amount of the second pump 97, the amount of the oil pumped from the first tank 93 via the oil path L-1 and drained at the second tank 94 becomes smaller than the amount of the oil pumped from the second tank 94 via the oil path L-3 and drained at the first tank 93.

However, in this embodiment, the partition plate 92 divides the reservoir tank 91 into the first tank 93 and the second tank 94. The part 99 forming the through hole formed at the partition board 92 connects the first tank 93 and the second tank 94 via a hole so that the level of the oil in the first tank 93 and the level of the oil in the second tank 94 are equalized.

As described above, the part 99 forming the through hole is formed at the partition board 92 and provided at the vicinity of the bottom surface of the reservoir tank 91. Therefore, in the vicinity of the part 99 forming the through hole, there is a small temperature difference between the oil in the first tank 93 and the oil in the second tank 94. Therefore, it is possible to increase the temperature of the oil cooled in the second tank 94 and to decrease the temperature of the oil having a high temperature in the first tank 93, by controlling the amount of the oil that passes through the part 99 forming the through hole.

In the exemplary embodiment, a fixing discharge pump is used as the first pump 95 and the discharge amount of the first pump is constant. Hence, it is possible to keep a proper temperature for the servo motor 27.

Furthermore, the oil cooling the servo motor 27, resulting in the oil having a relatively higher temperature, is supplied to the heat exchanger 96. Hence, it is possible to make the temperature difference between the oil and the heat exchange medium at the heat exchanger 96 relatively large.

Thus, since it is possible to improve the efficiency of heat exchange at the heat exchanger 96, it is possible to sufficiently utilize the cooling ability of the oil so that the motor 27 can be cooled sufficiently. As a result of this, since a sufficient amount of electric current can be supplied to the servo motor 27, the duty of the servo motor 27 can be increased sufficiently.

The present invention is not limited to these embodiments, but variations and modifications may be made without departing from the scope of the present invention.

For example, in this embodiment, the servo motor 27 for rotating the screw 23 is used as the electric driving part. However, the present invention is not limited to this. A servo motor for metering, mold clamping, or moving for plasticizing, can be used as the electric driving part of the present invention. The servo motor can usually contribute to energy saving more than the hydraulic driving apparatus, and a high rated torque can be obtained by the servo motor.

For example, in a case where the mold clamping motor 63 is used as a driving part of the mold clamping apparatus 50 (shown in FIG. 1) in the present invention, the timing belt 65 is provided at the loaded side of the output shaft of the mold clamping motor 63 so as to transmit the rotational motion of the mold clamping motor 63 to the ball screw shaft 59 (See FIG. 1).

Furthermore, a direct drive mechanism can be used for the mold clamping motor 63. In the direct drive mechanism, the above mentioned timing belt 65 is not used but an output shaft 133 of the mold clamping motor 63 is directly connected to the ball screw shaft 59 as shown in FIG. 4.

Figure 4:
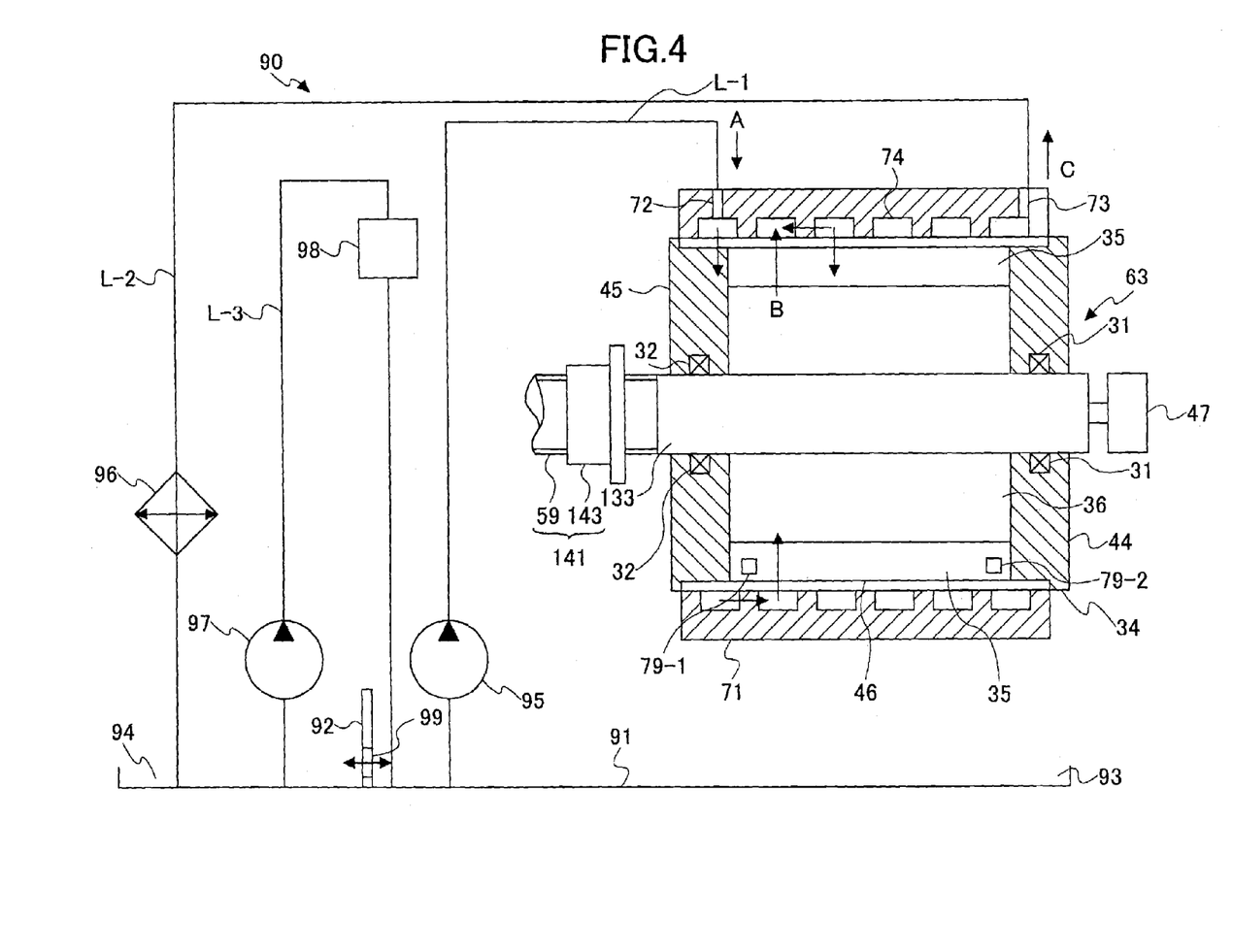
FIG. 4 is a conceptual view of a cooling mechanism of a direct drive mechanism in which an output shaft of a clamping motor of the injection molding machine shown in FIG. 1 as a driving part and ball screw shaft are directly connected.

Here, FIG. 4 is a conceptual view of a cooling mechanism of a direct drive mechanism in which the output shaft 133 of the clamping motor 63 of the injection molding machine 10 shown in FIG. 1 as a driving part and ball screw shaft 59 are directly connected. In FIG. 4, parts that are the same as the parts shown in FIG. 2 are given the same reference numerals, and explanation thereof is omitted.

A ball screw 141 is provided at an end part of a loaded side of the output shaft 133. The ball screw 141 functions as a motion direction conversion part by which motion direction is converted from a rotational motion to a rectilinear motion based on a rotation generated by driving the mold clamping motor 63. A mechanism part (not shown) provided at the ball screw 141 performs a designated actuation based on the rectilinear motion generated by the ball screw 141. The mechanism part functions as a load apparatus by which a load is added to the mold clamping motor 63 via the ball screw 141 and the output shaft 133 based on an actuation of the mechanism part.

The ball screw 141 includes the ball screw shaft 59 as a first conversion element and a ball nut 143 as a second conversion element. The ball screw shaft 59 is formed at the front (leftward in FIG. 4) of the output shaft 133 of the mold clamping motor 63 in a body. The ball nut 143 is screw-fixed with the ball screw shaft 59 and provided so as to be able to be advanced and retracted in right and left directions in FIG. 4. The ball nut 143 is advanced and retracted based on the rotation of the ball screw shaft 59 and the output shaft 133 in a body, and thereby the above mentioned mechanism part is actuated.

A roller screw may be used instead of the ball screw 141 as the motion direction conversion part. In this case, the roller screw includes a roller nut and a roller screw shaft. The roller nut is advanced and retracted by rotating the roller screw shaft.

As described above, in this embodiment, the ball screw shaft 59 is formed with the output shaft 133 in a body. However, the output shaft 133 may have a hollow structure and the ball nut 143 may be fixed at the output shaft 133. Under the above mentioned structure, the ball nut 143 may be rotated by rotating the output shaft 133 so that the ball screw shaft 59 may be advanced and retracted.

Furthermore, in the above mentioned embodiment, the injection cylinder 24 and the injection piston 25 are used as the hydraulic actuator 98 of the hydraulic circuit 90 that is the actuating part actuated by being supplied the actuating fluid. However, the present invention is not limited to this. For example, a mold clamping cylinder for actuating the toggle mechanism 57 required to have an operation at a high speed and under high pressure, may be applied to an actuating part of the present invention. In this case, the servo motor 27 may be used as a driving part for injection.

This patent application is based on Japanese priority patent applications No. 2002-171446 filed on Jun. 12, 2002 and No. 2002-183514 filed on Jun. 24, 2002, the entire contents of which are hereby incorporated by reference.

What is claimed is:

1. A cooling mechanism for cooling an electric driving part of an injection molding machine, comprising:
    a cooling part for cooling the electric driving part;
    a heat exchanger;
    an actuating part actuated by being supplied an actuating fluid, the actuating fluid being in fluid communication with the cooling part, wherein
    the actuating fluid is used as a cooling fluid for cooling the electric driving part,
    the actuating fluid is used by the actuating part and then discharged so as to be used as the cooling fluid, and
    the actuating fluid, by which the electric driving part is cooled and temperature of the actuating fluid is increased, is cooled by the heat exchanger and supplied to the actuating part;
    a first tank; and
    a second tank, wherein
    the actuating part uses the actuating fluid finished and, as the first tank receives the cooling fluid, the electric driving part receives the actuating fluid finished, and
    the second tank receives the actuating fluid supplied to the actuating part.

2. The cooling mechanism for cooling an electric driving part of an injection molding machine as claimed in claim 1, wherein the actuating fluid is oil, and the actuating part is actuated by hydraulic pressure.

3. The cooling mechanism for cooling an electric driving part of an injection molding machine as claimed in claim 1, further comprising:
    a first pump configured to pump the actuating fluid finished being used at the actuating part and configured to supply the actuating fluid to the electric driving part as the cooling fluid.

4. The cooling mechanism for cooling an electric driving part of an injection molding machine as claimed in claim 3, further comprising:
    a second pump configured to pump the actuating fluid and configured to supply the actuating fluid to the actuating part.

5. The cooling mechanism for cooling an electric driving part of an injection molding machine as claimed in claim 4, wherein a capacity of the first pump is smaller than a capacity of the second pump.

6. A cooling mechanism for cooling an electric driving part of an injection molding machine, comprising:
- a cooling part for cooling the electric driving part;
- a heat exchanger; and
- an actuating part actuated by being supplied an actuating fluid, the actuating fluid being in fluid communication with the cooling part, wherein
- the actuating fluid is used as a cooling fluid for cooling the electric driving part,
- the actuating fluid is used by the actuating part and then discharged so as to be used as the cooling fluid, and the actuating fluid, by which the electric driving part is cooled and temperature of the actuating fluid is increased, is cooled by the heat exchanger and supplied to the actuating part;
- a first tank; and
- a second tank connected to the first tank via a part forming a hole,
- wherein the actuating part uses the actuating fluid finished and, as the first tank receives the cooling fluid, the electric driving part receives the actuating fluid finished, and
- the second tank receives the actuating fluid supplied to the actuating part.

7. The cooling mechanism for cooling an electric driving part of an injection molding machine as claimed in claim 1, wherein the actuating part includes an injection cylinder and an injection piston of the injection molding machine, and
the cooling mechanism includes an electric driving part that is an electrically powered machine for rotating a screw of the injection molding machine.

8. The cooling mechanism for cooling an electric driving part of an injection molding machine as claimed in claim 1, further comprising a load apparatus connected to the electric driving part and actuated by driving the electric driving part, wherein the cooling part includes:
- a cooling fluid supplying opening part at a loaded side of the electric driving part where the load apparatus is connected through which actuating fluid is supplied as the cooling fluid is provided; and
- a cooling fluid discharge opening part at an unloaded side of the driving part where the load apparatus is not connected through which the actuating fluid is discharged as the cooling fluid is provided.

9. The cooling mechanism for cooling an electric driving part of an injection molding machine as claimed in claim 1, further comprising a load apparatus connected to the electric driving part and actuated by driving the electric driving part,
wherein a rotational speed detection part for detecting a rotational speed of the electric driving part is provided at an unloaded side of the electric driving part where the load apparatus is not connected.

10. The cooling mechanism for cooling an electric driving part of an injection molding machine as claimed in claim 1, further comprising a load apparatus connected to the electric driving part and actuated by driving the electric driving part,
wherein a loaded side temperature detection part for detecting a temperature at a loaded side of the electric driving part is provided at the loaded side of the electric driving part where the load apparatus is connected.

11. The cooling mechanism for cooling an electric driving part of an injection molding machine as claimed in claim 1, further comprising a load apparatus connected to the driving part and actuated by driving the electric driving part,
wherein an unloaded side temperature detection part for detecting a temperature at an unloaded side of the driving part is provided at the unloaded side of the driving part where the load apparatus is not connected.

* * * * *